US009205555B2

(12) United States Patent
Bosscher et al.

(10) Patent No.: US 9,205,555 B2
(45) Date of Patent: Dec. 8, 2015

(54) MANIPULATOR JOINT-LIMIT HANDLING ALGORITHM

(75) Inventors: Paul M. Bosscher, West Melbourne, FL (US); Matthew D. Summer, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 949 days.

(21) Appl. No.: 13/053,430

(22) Filed: Mar. 22, 2011

(65) Prior Publication Data

US 2012/0245736 A1 Sep. 27, 2012

(51) Int. Cl.
*B25J 9/16* (2006.01)

(52) U.S. Cl.
CPC .................................. *B25J 9/1607* (2013.01)

(58) Field of Classification Search
CPC .............................. B25J 9/1607; B25J 9/1643
USPC .................................................. 700/262, 263
See application file for complete search history.

(56) References Cited

U.S. PATENT DOCUMENTS

| | | | |
|---|---|---|---|
| 3,280,991 A | 10/1966 | Melton | |
| 3,637,092 A | 1/1972 | George et al. | |
| 4,216,467 A | 8/1980 | Colston | |
| 4,521,685 A | 6/1985 | Rebman | |
| 4,604,016 A | 8/1986 | Joyce | |
| 4,655,673 A | 4/1987 | Hawkes | |
| 4,661,032 A | 4/1987 | Arai | |
| 4,762,006 A | 8/1988 | Asakawa et al. | |
| 4,791,588 A | 12/1988 | Onda et al. | |
| 4,795,296 A | 1/1989 | Jau | |
| 4,837,734 A | 6/1989 | Ichikawa et al. | |
| 4,842,308 A | 6/1989 | Spotts | |
| 4,853,874 A | 8/1989 | Iwamoto et al. | |
| 4,860,215 A | 8/1989 | Seraji | |
| 4,862,751 A | 9/1989 | Asakawa et al. | |
| 4,893,254 A * | 1/1990 | Chan .................... B25J 9/1607 700/263 |
| 4,893,981 A | 1/1990 | Yoshinada et al. | |
| 4,975,856 A * | 12/1990 | Vold et al. .................... 700/263 |

(Continued)

FOREIGN PATENT DOCUMENTS

| | | |
|---|---|---|
| EP | 0672507 A1 | 9/1995 |
| EP | 1 876 505 A1 | 1/2008 |

(Continued)

OTHER PUBLICATIONS

European Search Report mailed Mar. 14, 2012, Application Serial No. 11009319.2-2316, in the name of Harris Corporation.

(Continued)

*Primary Examiner* — Stephen Holwerda
(74) *Attorney, Agent, or Firm* — Robert J. Sacco; Carol Thorstad-Forsyth; Fox Rothschild LLP

(57) ABSTRACT

A desired movement command (203) for a robotic device (100) having n joints (112) operating in an m degrees of freedom task space is analyzed to determine if it would cause any of the joint angular limits to be violated. In the case where a non-zero number L (241) of the joints (112) have angular limits that are violated, a revised movement command (254) is then constructed using $J_{mod}$ (251), which includes all columns in a Jacobian matrix J (211) except for those columns corresponding to L actively limited joints.

4 Claims, 6 Drawing Sheets

(56) References Cited

U.S. PATENT DOCUMENTS

| | | | |
|---|---|---|---|
| 5,004,391 A | 4/1991 | Burdea | |
| 5,007,300 A | 4/1991 | Siva | |
| 5,018,922 A | 5/1991 | Yoshinada et al. | |
| 5,092,645 A | 3/1992 | Okada | |
| 5,178,032 A | 1/1993 | Zona et al. | |
| 5,184,319 A | 2/1993 | Kramer | |
| 5,193,963 A | 3/1993 | McAffee et al. | |
| 5,231,693 A | 7/1993 | Backes et al. | |
| 5,382,885 A | 1/1995 | Salcudean et al. | |
| 5,413,454 A | 5/1995 | Movsesian | |
| 5,430,643 A * | 7/1995 | Seraji | B25J 9/1643 318/568.11 |
| 5,451,924 A | 9/1995 | Massimino et al. | |
| 5,508,596 A | 4/1996 | Olsen | |
| 5,565,891 A | 10/1996 | Armstrong | |
| 5,589,828 A | 12/1996 | Armstrong | |
| 5,619,180 A | 4/1997 | Massimino et al. | |
| 5,648,897 A | 7/1997 | Johnson et al. | |
| 5,694,013 A | 12/1997 | Stewart et al. | |
| 5,737,500 A | 4/1998 | Seraji et al. | |
| 5,792,165 A | 8/1998 | Klieman et al. | |
| 5,831,408 A | 11/1998 | Jacobus et al. | |
| 6,028,593 A | 2/2000 | Rosenberg et al. | |
| 6,047,610 A | 4/2000 | Stocco et al. | |
| 6,084,587 A | 7/2000 | Tarr et al. | |
| 6,088,017 A | 7/2000 | Tremblay et al. | |
| 6,104,158 A | 8/2000 | Jacobus et al. | |
| 6,178,775 B1 | 1/2001 | Higginbotham et al. | |
| 6,184,868 B1 | 2/2001 | Shahoian et al. | |
| 6,191,796 B1 | 2/2001 | Tarr | |
| 6,246,390 B1 | 6/2001 | Rosenberg | |
| 6,271,833 B1 | 8/2001 | Rosenberg et al. | |
| 6,281,651 B1 | 8/2001 | Haanpaa et al. | |
| 6,522,952 B1 | 2/2003 | Arai et al. | |
| 6,535,793 B2 | 3/2003 | Allard | |
| 6,592,315 B2 | 7/2003 | Osborne, Jr. | |
| 6,636,161 B2 | 10/2003 | Rosenberg | |
| 6,705,871 B1 | 3/2004 | Bevirt et al. | |
| 6,781,569 B1 | 8/2004 | Gregorio et al. | |
| 6,793,653 B2 | 9/2004 | Sanchez et al. | |
| 6,801,008 B1 | 10/2004 | Jacobus et al. | |
| 6,857,878 B1 | 2/2005 | Chosack et al. | |
| 7,138,981 B2 | 11/2006 | Kim et al. | |
| 7,158,112 B2 | 1/2007 | Rosenberg et al. | |
| 7,168,748 B2 | 1/2007 | Townsend et al. | |
| 7,208,900 B2 | 4/2007 | Carlson et al. | |
| 7,225,404 B1 | 5/2007 | Zilles et al. | |
| 7,345,672 B2 | 3/2008 | Jacobus et al. | |
| 7,411,576 B2 | 8/2008 | Massie et al. | |
| 7,480,600 B2 | 1/2009 | Massie et al. | |
| 7,714,895 B2 | 5/2010 | Pretlove et al. | |
| 7,783,384 B2 | 8/2010 | Kraft | |
| 7,933,667 B2 | 4/2011 | Sjoberg et al. | |
| 8,226,072 B2 | 7/2012 | Murayama | |
| 8,373,391 B1 | 2/2013 | Allen et al. | |
| 8,447,440 B2 | 5/2013 | Phillips et al. | |
| 8,473,101 B2 | 6/2013 | Summer | |
| 8,950,286 B2 | 2/2015 | Gosselin et al. | |
| 2001/0002098 A1 | 5/2001 | Haanpaa et al. | |
| 2001/0037163 A1 | 11/2001 | Allard | |
| 2003/0169235 A1 | 9/2003 | Gron et al. | |
| 2004/0189675 A1 | 9/2004 | Pretlove et al. | |
| 2004/0254771 A1 | 12/2004 | Riener et al. | |
| 2005/0087373 A1 | 4/2005 | Wakitani et al. | |
| 2005/0252329 A1 | 11/2005 | Demers | |
| 2006/0048364 A1 | 3/2006 | Zhang et al. | |
| 2006/0066574 A1 | 3/2006 | Kim et al. | |
| 2006/0117258 A1 | 6/2006 | Yu | |
| 2006/0178775 A1 | 8/2006 | Zhang et al. | |
| 2007/0013336 A1 * | 1/2007 | Nowlin | A61B 19/2203 318/568.21 |
| 2007/0050139 A1 | 3/2007 | Sidman | |
| 2007/0095582 A1 | 5/2007 | Stuijt et al. | |
| 2008/0009971 A1 | 1/2008 | Kim et al. | |
| 2008/0063400 A1 | 3/2008 | Hudson et al. | |
| 2008/0161733 A1 | 7/2008 | Einav et al. | |
| 2008/0266254 A1 | 10/2008 | Robbins et al. | |
| 2009/0074252 A1 * | 3/2009 | Dariush | G11C 16/349 382/107 |
| 2009/0182436 A1 | 7/2009 | Ferrara | |
| 2009/0234499 A1 | 9/2009 | Nielsen et al. | |
| 2010/0019890 A1 | 1/2010 | Helmer et al. | |
| 2010/0023185 A1 | 1/2010 | Terwelp et al. | |
| 2010/0041991 A1 | 2/2010 | Roundhill | |
| 2010/0070079 A1 | 3/2010 | Mangaser et al. | |
| 2010/0084513 A1 | 4/2010 | Gariepy et al. | |
| 2010/0092267 A1 | 4/2010 | Najdovski et al. | |
| 2010/0100256 A1 | 4/2010 | Jurmain et al. | |
| 2010/0168918 A1 | 7/2010 | Zhao et al. | |
| 2010/0169815 A1 | 7/2010 | Zhao et al. | |
| 2010/0172733 A1 | 7/2010 | Chalubert et al. | |
| 2010/0259614 A1 | 10/2010 | Chen | |
| 2011/0015569 A1 | 1/2011 | Kirschenman et al. | |
| 2011/0046781 A1 | 2/2011 | Summer | |
| 2011/0106339 A1 | 5/2011 | Phillips et al. | |
| 2011/0144828 A1 | 6/2011 | Chengalva | |
| 2011/0155785 A1 | 6/2011 | Laurent et al. | |
| 2011/0257786 A1 | 10/2011 | Caron L'Ecuyer et al. | |
| 2012/0095619 A1 | 4/2012 | Pack et al. | |
| 2012/0150351 A1 | 6/2012 | Bosscher et al. | |
| 2012/0184955 A1 | 7/2012 | Pivotto et al. | |
| 2012/0185098 A1 | 7/2012 | Bosscher et al. | |
| 2012/0185099 A1 | 7/2012 | Bosscher et al. | |
| 2012/0294696 A1 | 11/2012 | Summer et al. | |
| 2012/0306741 A1 | 12/2012 | Gupta | |
| 2013/0090194 A1 | 4/2013 | Ferlay et al. | |
| 2013/0328770 A1 | 12/2013 | Parham | |
| 2014/0031983 A1 | 1/2014 | Low et al. | |

FOREIGN PATENT DOCUMENTS

| | | |
|---|---|---|
| FR | 2 898 824 A1 | 9/2007 |
| GB | 2 228 783 A | 9/1990 |
| WO | 95 30571 A1 | 11/1995 |
| WO | 03 055061 | 7/2003 |
| WO | 2006 016799 A1 | 2/2006 |
| WO | 2007051000 A2 | 5/2007 |
| WO | 2008 135978 | 11/2008 |
| WO | 2010 040215 A1 | 4/2010 |
| WO | 2010/085184 A1 | 7/2010 |
| WO | 2011075093 | 6/2011 |

OTHER PUBLICATIONS

Torres Rocco, A.C., "Development and testing of a new C-based algorithm to control 9-degree-of-freedomwheelchair-mounted-robotic-arm system", Jun. 1, 2010, Univ. of So. Florida.

Alqasemi, R., et al., "Maximizing Manipulation Capabilities for People with Disabilities Using 9-DoF Wheelchair-Mounted Robotic Arm System", 2007, IEEE.

International Search Report mailed May 12, 2014, Applicaiton Serial No. PCT/US2013/069071, in the name of Harris Corporation.

Tijsma, et al., "A framework of interface improvements for designing new user interfaces for the MANUS robot arm", 2005, IEEE, 9th International Conference on Rehabilitation Robotics, Jul. 28-Jul. 1, 2005, Chicago, IL, USA.

Alqasemi R et al: "Kinematics, control and redundancy resolution of a 9-DoF wheelchair-mounted robotic arm system for ADL tasks",Mechatronics and Its Applications, 2009. ISMA '09. 6th International Symposium on, IEEE, Piscataway, NJ, USA, Mar. 23, 2009, pp. 1-7.

Tsumaki Y et al: "Design of a compact 6-DOF haptic interface", Robotics and Automation, 1998. Proceedings. 1998 IEEE International Conference on Leuven, Belgium May 16-20, 1998, New York, NY, USA, IEEE, US, vol. 3, May 16, 1998, pp. 2580-2585.

Bley F et al: "Supervised navigation and manipulation for impaired wheelchair users", Systems, Man and Cybernetics, 2004 IEEE International Conference on, IEEE, Piscataway, NJ, USA, vol. 3, Oct. 10, 2004, pp. 2790-2796.

International Search Report mailed May 2, 2013, International Application No. PCT/US2012/051314, in the name of Harris Corporation.

(56) References Cited

OTHER PUBLICATIONS

Zarrad, W., et al., "Stability and Transparency Analysis of a Haptic Feedback Controller for Medical Applications", Proceedings of the 46th IEEE Conference on Decision and Control : New Orleans, LA, Dec. 12-14, 2007, IEEE, Piscataway, NJ, USA, Dec. 1, 2007, pp. 5767-5772.

Cheung, Y., et al., "Cooperative Control of a Multi-Arm System Using Semi-Autonomous Telemanipulations and Adaptive Impedance", Advanced Robotis, 2009. ICAR 2009. International Conference on, IEEE, Piscataway, NJ, USA, Jun. 22, 2009, pp. 1-7.

Suzuki, A., et al., "Performance conditioning of time delayed bilaterial teleoperation system by scaling down compensation value of communication disturbance observer", Advanced Motion Control, 2010, 11th IEEE International Conference On, IEEE, Piscataway, NJ, USA, Mar. 12, 2010, pp. 524-529.

Tzafestas, C., et al., "Adaptive impedance control in haptic teleoperation to improve transparency under time-delay", 2008 IEEE International Conference on Robotics and Automation. The Half-Day Workshop on: Towards Autonomous Agriculture of Tommorow, IEEE-Piscataway, NJ, USA, Piscataway, NJ, USA, May 19, 2008, pages 212-219.

International Search Report mailed May 23, 2012; Application Serial No. PCT/US2011/066873 in the name of Harris Corporation.

Everett L J et al; "Automatic Singularity Avoidance Using Joint Variations in Robot Task Modification", IEEE Robotics & Automation Magazine, IEEE Service Center, Piscataway, NJ, US, vol. 1, No. 3, Sep. 1, 1994, pp. 13-19, XP011420425.

Jonghoon Park et al.: "Reconstruction of Inverse Kinematic Solution Subject to Joint Kinematic Limits Using Kinematic Redundancy", Intelligent Robots and Systems '96, IROS 96, Proceedings of the 1996 L EEE/RSJ International Conference on Osaka, Japan, Nov. 4-8, 1996, New York, NY, IEEE, US, vol 2, 4, Nov. 1996, pp. 425-430, XP010212433.

Hamid Abdi et al: "Joint Velocity Redistribution for Fault Tolerant Manipulators", Robotics Automation and Mechatronics (RAM), 2010 IEEE Conference ON, IEEE, Piscataway, NJ, USA, Jun. 28, 2010, pp. 492-497, XP031710198.

International Search Report mailed Jun. 28, 2012, Application Serial No. PCT/US2012/027475 in the name of Harris Corporation.

Marshall, W.C., et al., "A Testbed for Deisgn of User-Friendly, Multiple-Degree-Of-Freedom, Manual Controllers", Scientific Honeyweller, Honeywell's Corporate. Minneapolis, US Jan. 1, 1993, pp. 78-86.

International Search Report dated Oct. 29, 2012; Application Serial No. PCT/US2012/034207 in the name of Harris Corporation.

International Search Report dated Jan. 15, 2013, Application Serial No. PCT/US2012/037751 in the name of Harris Corporation.

International Search Report mailed Jan. 4, 2013, International Application Serial No. PCT/US2012/058303 in the name of Harris Corporation.

Rogers, JE., et al., "Bi-directional Gap Closing MEMS Actuator Using Timing and Control Techniques", IEEE Industrial Electronics, IECON 2006—32nd Annual Conference on, IEEE, Piscataway, NJ USA Nov. 1, 2006, pp. 3469-3154.

TAS, NR, et al., "Technical Note: Design, fabrication and testing of laterally driven electrostatic motors employing walking motion and mechanical leverage", Journal of Micromechanics & Microengineering, Institute of Physics Publishing, Bristol, GB, vol. 13, No. 1, Jan. 1, 2003. N6-N15.

Tijsma, H.A. et al., A Framework of Interface Improvements for Designing New User Interfaces for the MANUS Robot Arm, Proceedings of the 2005 IEEE, 2005, 235-240.

Rocco, Ana Catalina Torres, Development and testing of a new C-based algoithm to control a 9-degree-of-freedom wheelchair-mounted-robotic-arm system, University of South Florida, Jun. 1, 2010.

\* cited by examiner

MANIPULATOR JOINT-LIMIT HANDLING ALGORITHM

STATEMENT OF THE TECHNICAL FIELD

The inventive arrangements relate generally to the control of robotic joints. More specifically, an embodiment discloses a method and related system for handling situations in which joint limits are reached in a robotic system.

DESCRIPTION OF THE RELATED ART

Robotic systems are becoming increasingly common and find use in a wide variety of fields, such as manufacturing and remote sensing. As shown in FIG. 1, a robotic system 10 may include a robotic arm 12 mounted to a base 14, which can be mobile. The arm 12 has an end-effector 16 and a plurality of joints 18 to move and position the end-effector 16 as desired by, for example, a remote operator. Each joint has a respective motor or actuator as known in the art to induce changes in the angular position of that joint 18. Determining the angular and spatial positioning of each of the joints 18 to effect the desired positioning and velocity of the end-effector 16 is a well-known problem in the field.

One problem frequently experienced by robotic systems, particularly systems that are controlled by a human operator, such as the system 10, is that situations arise in which the desired velocity of the end-effector 16 will cause one or more of the joints 18 to reach its limit. Consequently, the robotic arm 12 will be physically unable to fulfill the command. The typical response of the system 10 in such situations is to ignore the command and do nothing, while perhaps indicating to the operator that the desired action cannot be performed. This "all or nothing" approach to end-effector 16 movement tends be unsatisfying for the user, however.

It is therefore desirable to provide alternative methods and related systems for controlling the movement of a robotic arm.

SUMMARY OF THE INVENTION

In one aspect a method for controlling a plurality of joints in a robotic device is disclosed. At least a portion of the joints have respective joint travel limits. Based on the type of joint (e.g. revolute, prismatic, etc.) the joint movement can be rotational, linear, etc. and thus the joint travel limits can be expressed accordingly (e.g. limits on angular displacement). Most robotic manipulators utilize rotational joints and the joint travel is expressed in terms of joint angles. For simplicity, only rotational joints will be discussed for the purposes of explaining the invention, but it should be understood that the algorithm described is applicable to robotic mechanisms with any types of joints in any combination.

A desired movement command for the robotic device is analyzed to determine if it would cause any of the joint limits to be violated. A revised movement command for the robotic device is then constructed utilizing the current angular state of the joints in the robotic device and the desired movement command. The revised movement command is constructed so as to avoid violating any of the respective joint limits. The revised movement command is not identical to the desired movement command and when processed by the robotic device causes movement of the robotic device. The revised movement command is then used in place of the desired movement command to cause corresponding movement of the robotic device.

In various embodiments weighting factors that weight respective movements of the joints are used to generate the revised movement command. In a specific, preferred embodiment in which the robotic device comprises n joints, robot is operating in an m-dimensional workspace, and where the desired movement command would cause L of the n joints to violate their respective joint limits, the revised joint movement command for the robotic device is constructed according to the following equation:

$$\dot{q}_{mod} = J_{mod}(J_{mod}^T W^2 J_{mod})^{-1} J_{mod}^T W^2 \dot{x}_{cmd},$$

and $$\dot{q}_{new} = re(\dot{q}_{mod}),$$

wherein $\dot{q}_{mod}$ is the (n−L)×1 joint velocity command for the joints that are not currently being limited, $\dot{q}_{new}$ is the n×1 new joint velocity command, $J_{mod}$ is an m×(n−L) matrix, $J_{mod}^T$ is the transpose of $J_{mod}$, W is an m×m matrix containing the weighting factors, and $\dot{x}_{cmd}$ is the desired movement command for the robot tool velocity.

$J_{mod}$ can be constructed by determining an m×n Jacobian matrix J for the robotic device utilizing the current joint angular state information of the robotic device, and then utilizing the Jacobian matrix J to generate the matrix $J_{mod}$, in which $J_{mod}$ comprises all columns in J except for those columns corresponding to the L joints. The new joint velocity command, $\dot{q}_{new}$ is reconstructed from $\dot{q}_{mod}$ via the reconstruction function re( ). This function simply substitutes in zero terms for each of the joints that is actively being limited. Then, utilizing the new joint velocity command in place of the desired movement command results in a tool velocity of $\dot{x}_{new}$:

$$\dot{x}_{new} = J\dot{q}_{new},$$

where $\dot{x}_{new}$ is the tool velocity that is near as possible to the original commanded tool velocity $\dot{x}_{cmd}$ without violating any of the joint limits. In a specific embodiment $\dot{q}_{new}$ is then checked to see if it would cause any of the joint limits of the robotic device to be violated.

A system for controlling a robotic device is also disclosed that employs the above method.

BRIEF DESCRIPTION OF THE DRAWINGS

Embodiments will be described with reference to the following drawing figures, in which like numerals represent like items throughout the figures, and in which.

DETAILED DESCRIPTION

The various embodiments of the present invention are described with reference to the attached figures, wherein like reference numbers are used throughout the figures to designate similar or equivalent elements. The figures are not drawn to scale and they are provided merely to illustrate the embodiments of the present invention. Several aspects of the invention are described below with reference to example applications for illustration. It should be understood that numerous specific details, relationships, and methods are set forth to provide a full understanding of the invention. One having ordinary skill(s) in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts can occur in different orders and/or concurrently with other acts or events. Furthermore, not all illustrated acts or events are required to implement a methodology in accordance with the present invention. For simplicity, only rotational joints will be discussed for the purposes of explaining the invention, but it should be understood that the algorithm described is applicable to robotic mechanisms with any types of joints in any combination.

Figure 1:
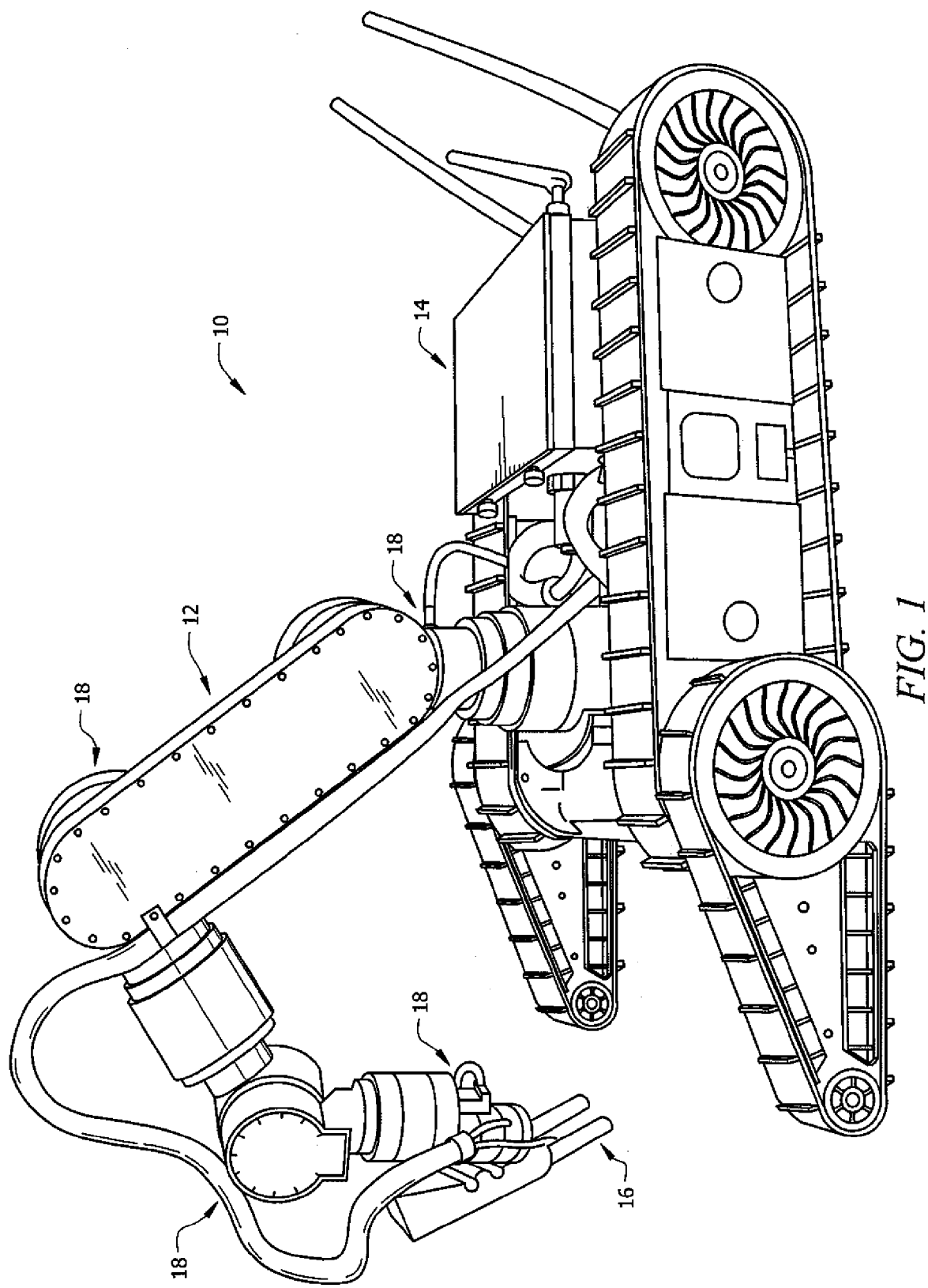
FIG. 1 is a perspective view of a robotic system that includes a robotic arm.

As shown in FIG. 1, a robotic system 10 may include a robotic arm 12 mounted to a base 14, which can be mobile. The arm 12 has an end-effector 16 and a plurality of joints 18 to move and position the end-effector 16 as desired by, for example, a remote operator. Each joint has a respective motor or actuator as known in the art to induce changes in the travel (in this case angular) position of that joint 18. Determining the angular and spatial positioning of each of the joints 18 is necessary to effect the desired positioning and velocity of the end-effector 16. Generally, the solution to this problem can be understood with reference to the following equation:

$$\dot{x} = J\dot{q},$$

in which $\dot{x}$ is the velocity vector of the end-effector 16, $\dot{q}$ is the joint velocity vector for the joints 18 and J is the Jacobian matrix for the arm 12 in its current state. In the above-referenced equation, $\dot{x}$ is an m-dimensional vector. Frequently m is six, having three linear components and three angular components; it will be appreciated, however, that other values of m are certainly possible. The current angular position of each of the joints 18 may be provided by a vector q, the time differential of which is $\dot{q}$, the desired movements of the joints 18. The vector q may be constructed, for example, from feedback obtained from the joints 18 themselves; that is, each joint 18 can include a sensor that indicates the current travel position of that joint 18. Other means can also be provided to indicate the current travel position of a joint 18. As a general matter, the Jacobian matrix J can be computed using q, knowledge of the length of the shape and extents of the mechanical links between each of the joints 18, and, optionally, a tool offset vector value depending upon the type or state of end-effector 16 then in use. The Jacobian matrix J can be generated based on inputs from position sensors associated with joints 18.

Figure 2:
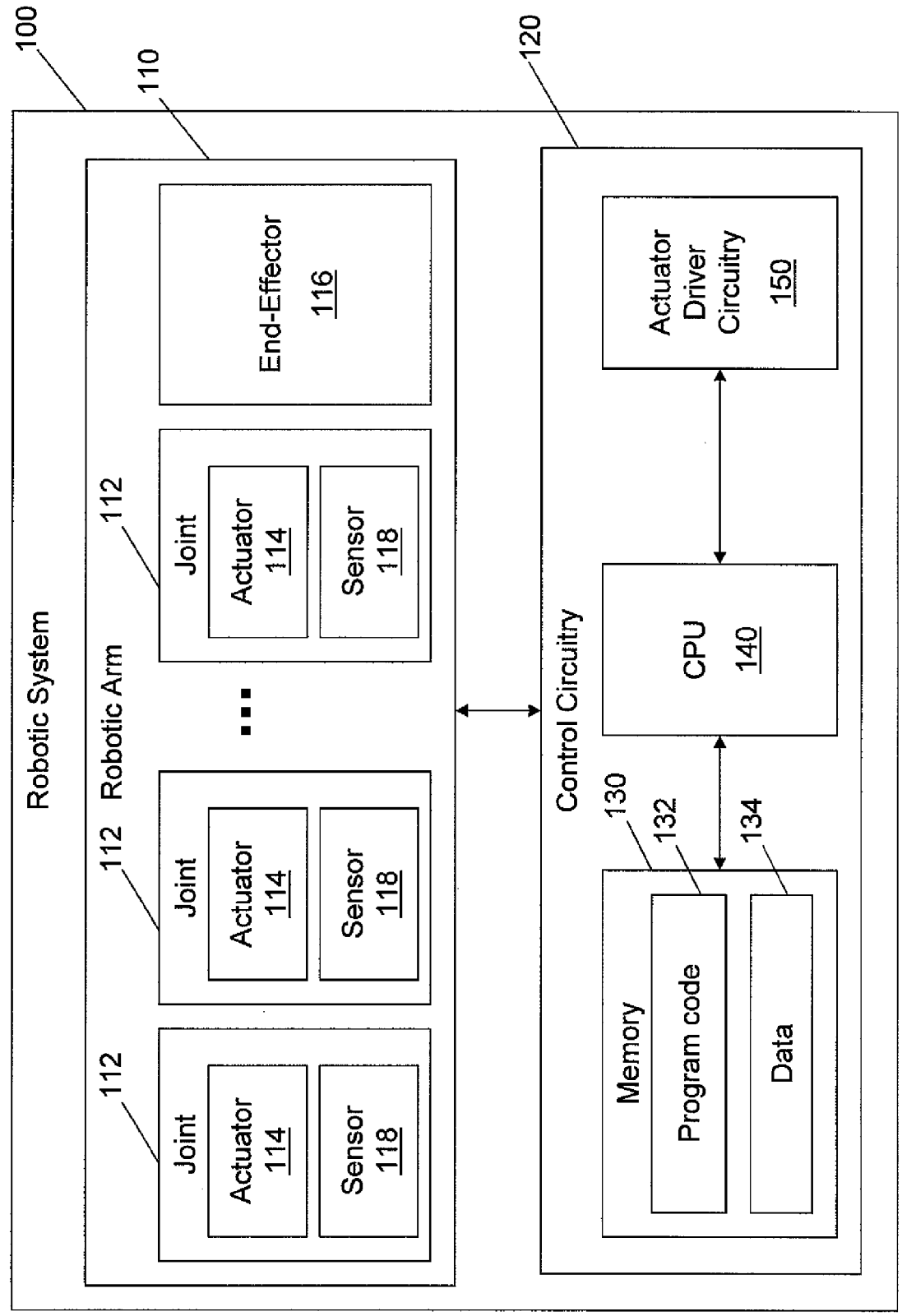
FIG. 2 is a block diagram of an embodiment robotic system.
Figure 3:
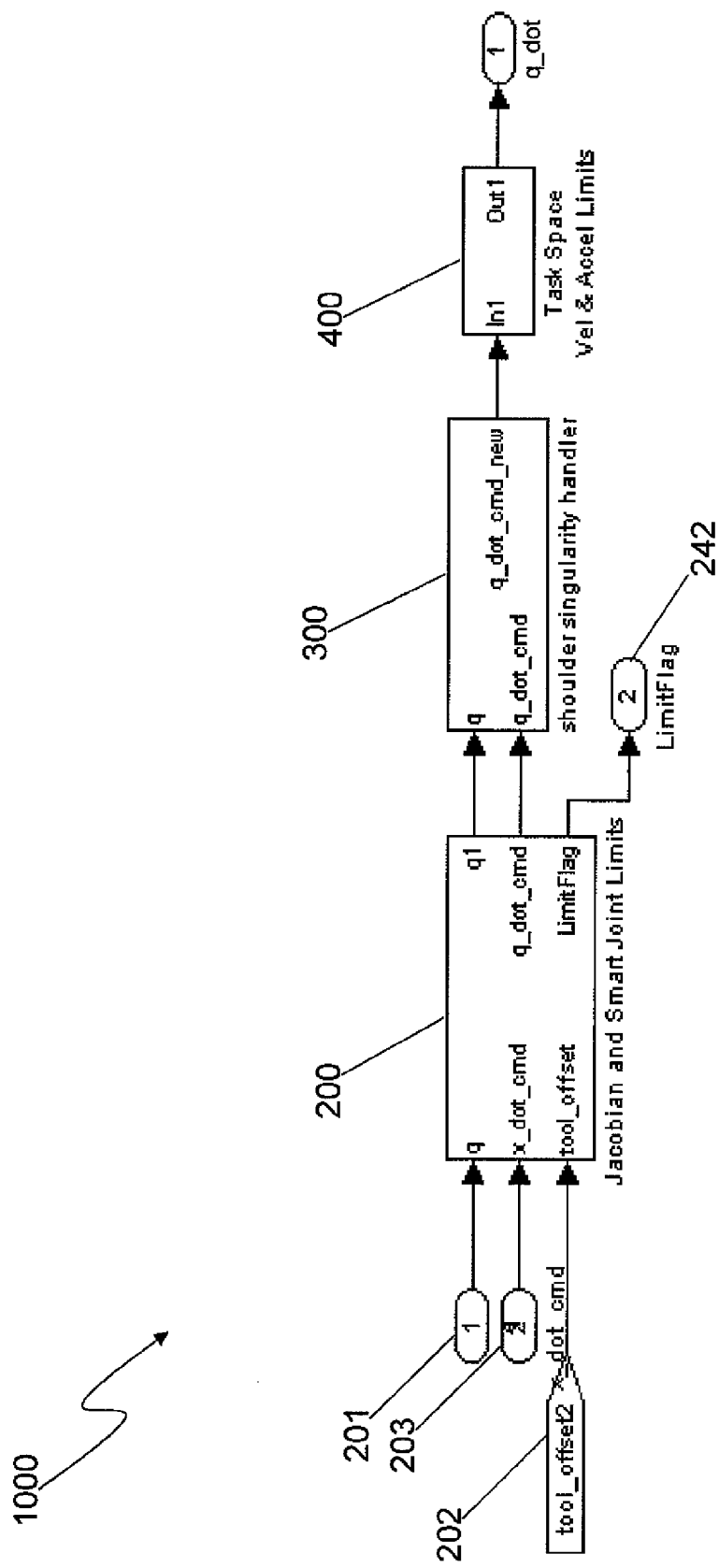
FIG. 3 is a logic flow chart for an embodiment robotic arm positioning algorithm.

Referring to FIG. 2, various embodiments can be employed to control the movement of a robotic arm 110 in a robotic system 100. In particular, various embodiment methods can be used to control the velocity and positioning of an end-effector 116 of the robotic arm 110. The robotic arm 110 can be substantially conventional in nature, including a plurality of serially connected joints 112 that terminate in the end-effector 116. The end-effector 116 can be a clamp, a cutter or any other tool suitable to accomplish the desired task set forth for the robotic system 100. Each of the joints 112 can include a respective motor or actuator 114 that controls the positioning (angular or otherwise) of that joint 112; exemplary actuators 114 include pneumatically or hydraulically driven devices, stepper motors, DC motors and the like as known in the field. For purposes of the following, an "actuator" is intended to include any device that causes movement of a respective joint.

In a preferred embodiment the robotic system 100 is controlled by software 132. More specifically, the robotic system 100 includes control circuitry 120 that controls the various actuators 114 and end-effector 116 of the robotic arm 110. This control circuitry 120 includes one or more central processing units (CPUs) 140 in communications with memory 130. For purposes of the following a single CPU 140 is considered, but it will be appreciated that multiple CPUs 140 can be employed to provide the functionality described herein, as known in the art. Additionally, the term "CPU" is intended to include any type of circuit that is capable of processing data. The memory 130 stores program code 132 that is executable by the CPU 140, causing the CPU 140 to perform the various steps discussed below, including sending commands to actuator driver circuitry 150. The memory 130 and related program code 132 may include machine-readable or interpretable code held in volatile memory or non-volatile memory, as well as, for example, microcode. The actuator driver circuitry 150 and the CPU 140 are in communications with each other, and the actuator driver circuitry 150 accepts commands from the CPU 140 to enable the CPU 140 to control the actuators 114.

The actuator driver circuitry 150 sets the speed and angular position of each joint 112 in a manner corresponding to the command by controlling the respective actuator 114 for that joint 112. The actuator driver circuitry 150 can be conventional in nature. For purposes of this discussion it is treated as a single logical unit, but in practice the actuator driver circuitry 150 can be dispersed across the robotic system 100; for example, portions of it can be present near each actuator 114. Also, for purposes of the following it is assumed that the control circuitry 120 is bundled together as a unit, preferably disposed within the body of the robotic system 100. However, it will be appreciated that various aspects of the control circuitry 120 may be dispersed; for example, the actuator driver circuitry 150 may be disposed in the chassis of the robotic system 100 and coupled to networking hardware, while the memory 130 and CPU 140 may be distal from the actuator circuitry 150, such as at a base station, and remotely controlling the remainder of the robotic system 100 via the networking hardware, as known in the art. Hence, FIG. 2 illustrates only a minimum configuration, and should not be construed as limiting the actual physical locations of the various units 110, 130, 140 and 150.

The program code 132 contains steps executable by the CPU 140 to implement the logic operations set forth in FIGS. 3-6. Additionally, the memory 130 includes data 134 that is used by the program code 132 to perform the various logical operations discussed in the following. For example, the data 134 can include information about the link lengths between the joints 112, store the current joint 112 angular positions q, contain information concerning the end-effector 116 and so forth. Hence, it will be understood that data 134 includes information sufficient to construct a Jacobian matrix J for the robotic arm 110. With specific reference to FIG. 3, the logic flow 1000 as provided by the program code 132 and data 134 is presented. In particular, a first logic system 200 determines the Jacobian matrix for the system 100 and handles the intelligent limiting of joint 112 movement. A second logic system 300 is a shoulder singularity handler, accepting as input data output by the first block 200 and preventing joint singularities from arising, as known in the art. A third logic system 400 is a task space velocity and acceleration limiter. Third logic system 400 accepts as input the output of the second logic system 300 and controls the velocities and accelerations of each joint 112 to ensure that respective limits are not exceeded. This may be performed in a conventional manner as known in the art. By way of example, a simple method for performing this is to compare the desired joint velocity command to the previous velocities of the joints and calculate the resulting joint accelerations:

$$\ddot{q}_i = \frac{\dot{q}_{i,des} - \dot{q}_{i,prev}}{\Delta t}$$

where $\ddot{q}_i$ is the acceleration of joint i if it were to execute the new desired joint velocity a $\dot{q}_{i,des}$, $\dot{q}_{i,prev}$ is the velocity of joint i at the previous time step, and $\Delta t$ is the length of time between velocity commands. If $\dot{q}_{i,des}$ or $\ddot{q}_i$ exceed the velocity or acceleration limit for the joint i, respectively, then let the ratio of the desired velocity (or acceleration) to the allowed velocity (or acceleration) be $r_i$. For example, if $\dot{q}_{i,des}$=100 deg/s but joint i can only move at 50 deg/s, then $r_i$=100/50=2. After considering all n joints, let the largest value of $r_i$ that occurs be $r_{max}$. Then the joint velocity command sent to the motors, $\dot{q}_{i,cmd}$, is calculated as:

$$\dot{q}_{i,cmd} = \frac{\dot{q}_{i,des}}{r_{max}}$$

The output of the third logic system 400 is then fed as input into the actuator driver circuitry 150 to control the robotic arm 110. Each of these logic systems 200, 300 and 400 can be thought of as subroutines within the program code 132 that controls the overall functionality of the robotic system 100. Because logic systems 300 and 400 are conventional in nature, no further description of them shall be provided in the following.

Figure 4:
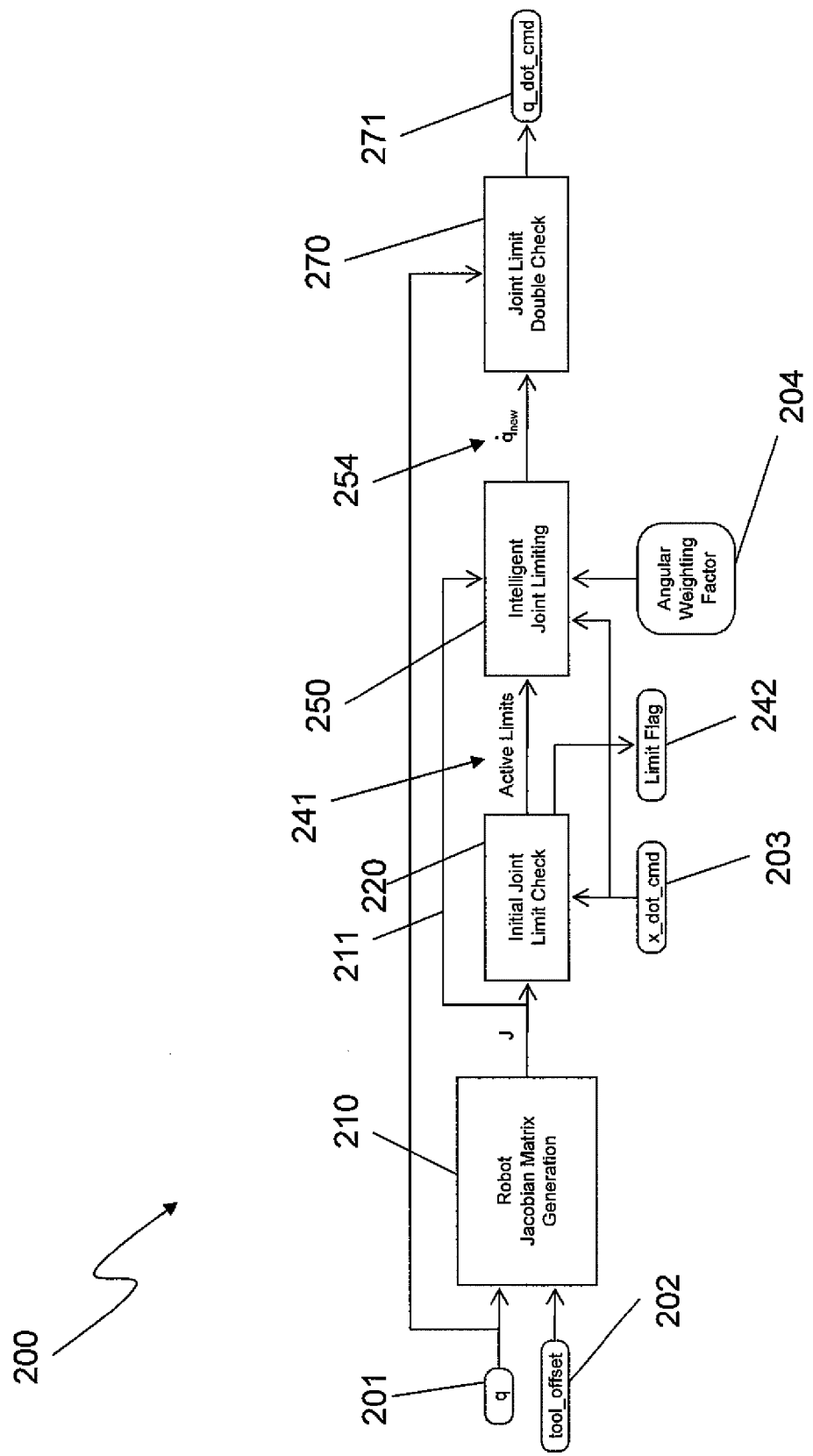
FIG. 4 is detailed logic flow chart for a logic block depicted in FIG. 3.

FIG. 4 is a detailed logic diagram of the logic system 200. As a first step the logic system 200 includes a Jacobian matrix generator 210. The Jacobian matrix generator 210 generates a Jacobian matrix J 211 for the system robotic arm 110. The matrix J 211 is an m×n matrix, where "n" is the number of joints 112 and "m" is number of degrees of freedom of the robot end-effector 116, i.e., the dimension of the robot tool workspace. In the following disclosure six-dimensional velocity vectors are discussed by way of example, having three linear components and three angular components. It should be understood, however, that the systems and methods discussed herein can be readily generalized to arbitrary dimensionalities. The Jacobian matrix generator 210 uses known techniques to generate the Jacobian matrix J 211 for the robotic arm 110 using as inputs an n×1 vector q 201 that contains the current angular positions of each of the joints 112, a tool offset value 202, and information stored in the data 134 relating to the link lengths between the joints 112. Formulation of Jacobian matrices is well-known in the art—see, for example, "Introduction to Robotics: Mechanics and Control" by John J. Craig (1989). The tool offset value 202 may change depending upon the specific end-effector 116 in use at the time, and can be, for example, a 3×1 vector indicating the position of the end-point of the end-effector 116 with respect to a coordinate frame attached to the end of the robotic arm 110.

Input data q 201 may be generated by any technique known in the art. By way of example, the control circuitry 120 can generate the angular position vector q 201 for the joints 112 by obtaining current joint angular information from respective sensors 118 for each joint 112. That is, the CPU 140 can generate and store as data 134 into memory 130 joint angle information q 201 by respectively querying each sensor 118, as known in the art. However, it will be appreciated that sensors 118 are not required; other methods exist for obtaining the current joint angle information vector q 201. For example, the CPU 140 can keep track of the number and direction of steps taken by each actuator 114 in the event stepper motors are used, or otherwise track the rotational movements of motors used as actuators 114. In short, current travel displacement information q 201 for the joints 112 can be obtained from hardware, software or combinations of the two, as known in the art.

As a second step, the Jacobian matrix J 211 output by the Jacobian matrix generator 210 is then fed into an initial joint limit check 220 which uses the Jacobian matrix 211 and the desired end-effector 116 velocity $\dot{x}_{cmd}$ 203, as obtained from a user, to determine an initial ("nominal") guess of the joint velocities $\dot{q}_{nom}$. In the case where J is square and invertible this can be found using a matrix inverter, which generates the inverse matrix $J^{-1}$ of the Jacobian matrix J 211, using known techniques, such as those described in Craig (1989). In this case nominal joint velocity vector $\dot{q}_{nom}$ is:

$$\dot{q}_{nom} = J^{-1}\dot{x}_{cmd}.$$

In the case where J 211 is non-square other well-known methods are available for calculating $\dot{q}_{nom}$, which can be found in references such as Craig (1989).

The input vector $\dot{x}_{cmd}$ 203 represents a desired movement command for the end-effector 116, as indicated by an operator of the robotic system 100, and like q 201 and the tool offset 202, is an input into the algorithm for controlling the robotic arm 110. For example, using known user input/output interface techniques, an operator of the robotic system 100 can cause commands to be sent to the control circuitry 120, which when processed yield the operator-desired movement vector $\dot{x}_{cmd}$ 203. Hence, $\dot{q}_{cmd}$ 203 can be obtained in a standard manner, and similarly $\dot{q}_{nom}$ can be computed in a standard manner. The computed n×1 vector $\dot{q}_{nom}$ thus represents the conventional joint 112 angular velocities required to obtained the desired movement of $\dot{x}_{cmd}$ 203 for the end-effector 116 if no joint limits were present.

Figure 5:
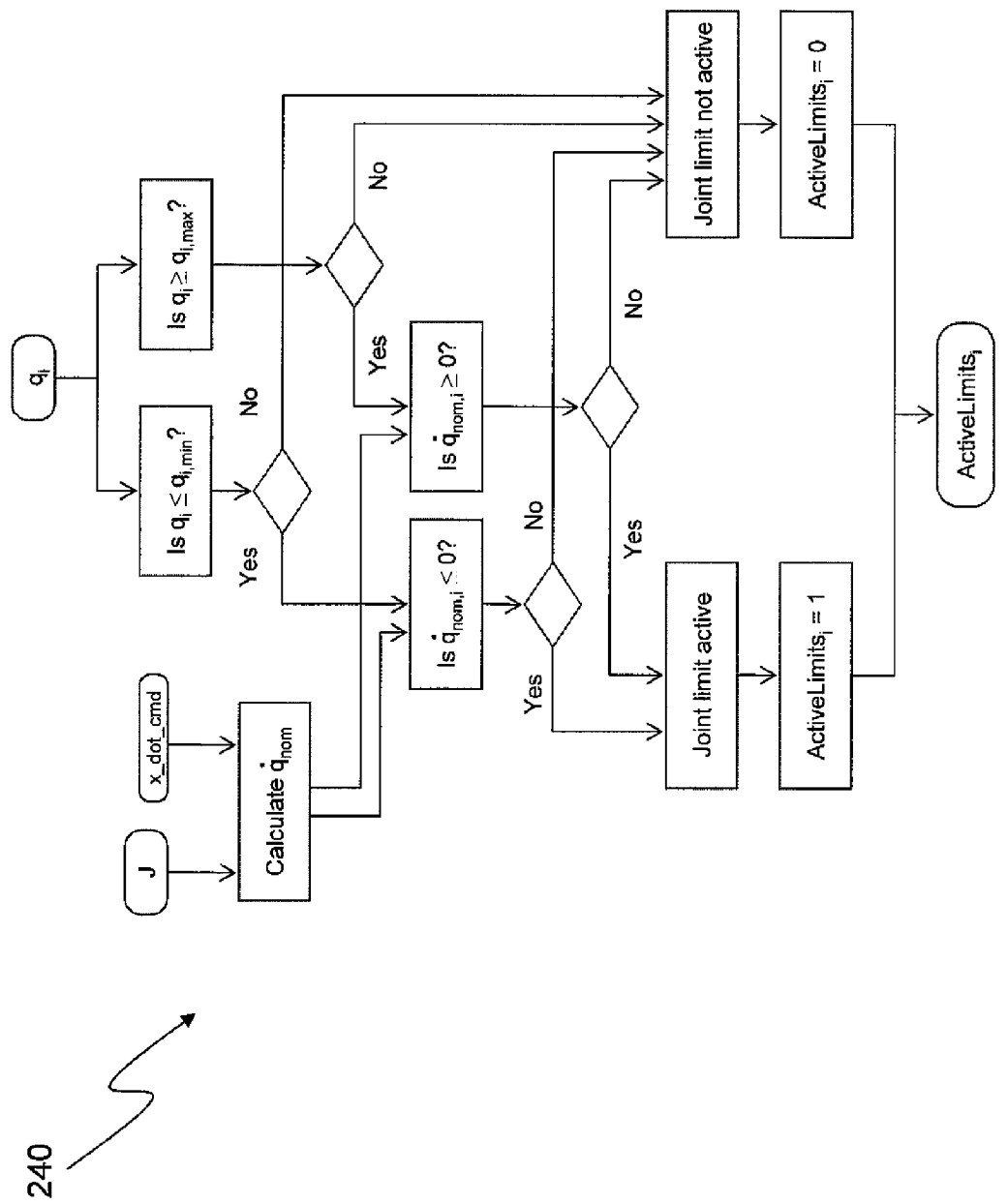
FIG. 5 illustrates a logic flow chart for a sub-block shown in FIG. 4.

As a fourth step, which can be part of the initial joint limit check 220, the control circuitry 120 then checks to see if the joint 112 movement indicated by the nominal joint velocity vector $\dot{q}_{nom}$ is valid or if it causes one or more of the joints 112 to violate a respective travel limit, i.e., by attempting to extend below or above lower and upper angular bounds, respectively. Specifically, the control circuitry 120 accepts as input $\dot{q}_{nom}$ and q 201, and using these values for each joint 112 determines if the joint 112 travel limit has been reached and if so, if the desired joint velocity as specified by $\dot{q}_{nom}$ would cause that joint 112 to violate that limit, i.e, move beyond an upper angular bound or below a lower angular bound. If a limit has been reached and if the desired joint velocity $\dot{q}_{nom}$ would cause that joint 112 to violate the limit, then a joint active limits flag 241 is set for that joint 112, indicating that its angular limit has been reached. Hence, the joint active limits flags 241 may have "n" components, one for each of the joints 112. Joint limit checking may be performed in a conventional manner, as known in the art. A flow chart illustrating the logic of the initial joint limiter 240 is shown in FIG. 5 by way of example. This process can be repeated n times in order to form the full active limits vector 241. Additionally, a limit flag 242 may be set if any of the joint active limit flags 241 are set, which can be used to, for example, warn a user that limits have been reached.

As a fifth step 250, improved joint limiting logic 250 accepts the joint active limits flags 241, the operator-desired movement vector $\dot{x}_{cmd}$ 203, the Jacobian matrix 211 and a scalar weighting factors 204 and generates a revised joint velocity command $\dot{q}_{new}$ 261. The $\dot{q}_{new}$ vector 261 is an n×1 vector of joint velocities that result in the end-effector 116 moving with a new velocity $\dot{x}_{new}$ and represents a "closest fit" to the desired velocity vector $\dot{x}_{cmd}$ 203 that the robotic arm 110 can actually perform in view of the active angular limits 241 reached by the joints 112. Hence, under the degenerate conditions where $\dot{x}_{cmd}$ 203 would not cause any of the joints 112 to exceed their respective limits, $\dot{x}_{cmd}$ 203 and $\dot{x}_{act}$ 251 would be the same.

Figure 6:
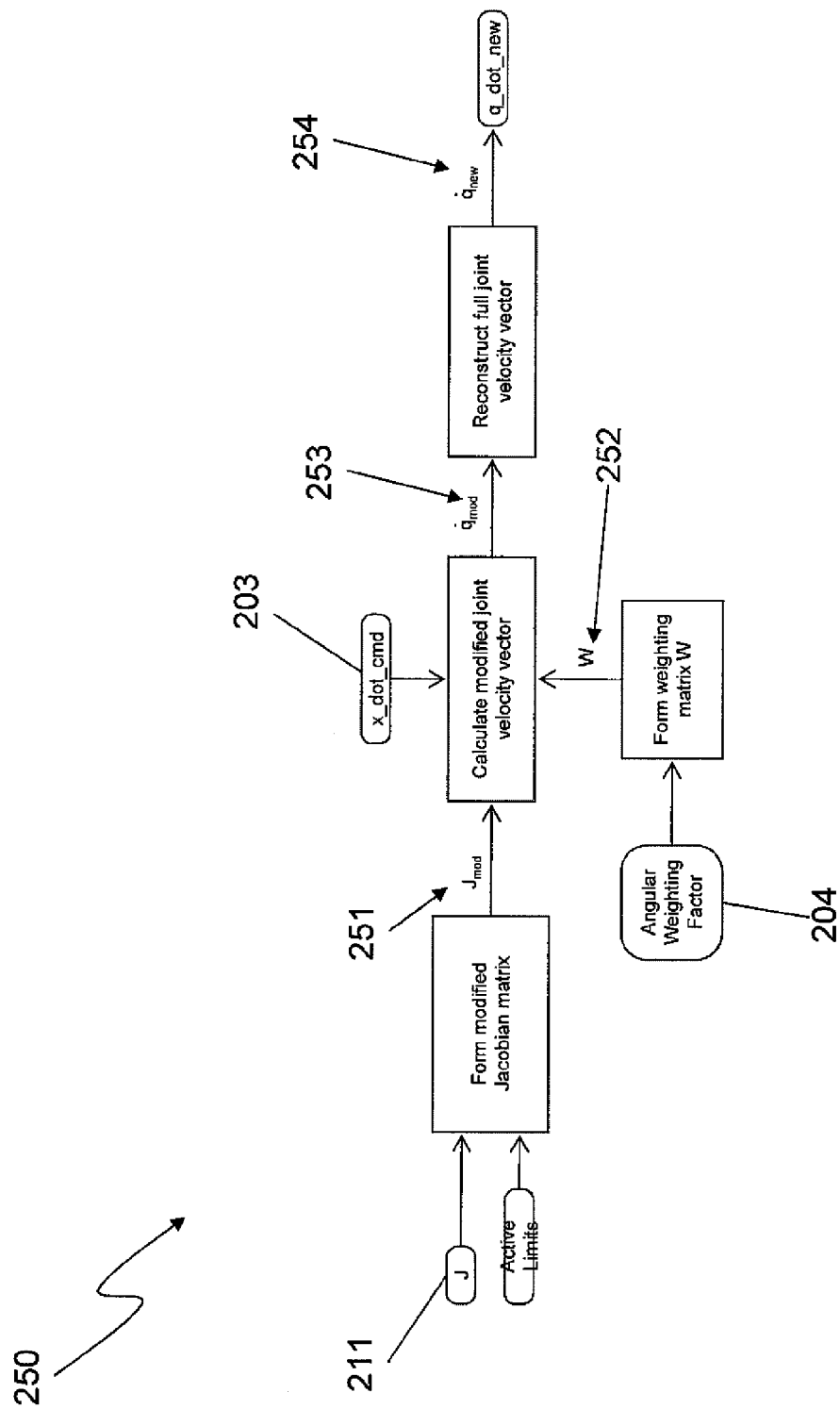
FIG. 6 illustrates a logic flow chart for another sub-block shown in FIG. 4.

The details of constructing $\dot{q}_{new}$ are outlined in FIG. 6, which illustrates the details of the embodiment intelligent joint limiter 250. The improved joint limiting logic 250 constructs a matrix $J_{mod}$ 251 that is derived from the input Jacobian matrix J 211 obtained from first logic sub-system 210. To construct $J_{mod}$ 251, the Jacobian matrix J 211 is first constructed for the robotic arm 110 in a standard manner as described above, using the current angular states q 201 of all of the joints 112 and the tool offset vector 202. Then, if a joint 112 that has an active limits flag 241 set (i.e. ActiveLimits$_i$=1), the matrix column for that joint 112 is removed, in effect turning the Jacobian matrix J 211 from an m×n matrix into a modified m×(n−1) matrix so that the limited joint 112 is not represented in the modified Jacobian matrix $J_{mod}$ 251. Of course, more than one joint 112 may be limited, as indicated by the active limits flags 141. Letting L denote the number of joints whose limits are active, as indicated by the active limits flags 241, a total of L columns of the Jacobian matrix J 211 can be removed, resulting in a modified Jacobian matrix $J_{mod}$ 251 that is an m×(n−L) matrix.

A matrix of weighting factors 252 (also referred to herein as weighting matrix W 252) is then formed based on, for example, a user-specified angular weighting factor 204. The weighting matrix W 252 is an a m×m matrix where, like the Jacobian matrix J 211, "m" is the dimension of the end-effector 116 velocity vector. Weighting matrix W 252 may be loosely thought of as setting the weighting for the relative importance of matching desired motions in different directions. For example, the formulation of W 252 for a typical 6-dimensional task space (3 linear dimensions and 3 angular dimensions) is as follows. Let the angular weighting factor 204 be a. Then W 252 is:

$$W = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & a & 0 & 0 \\ 0 & 0 & 0 & 0 & a & 0 \\ 0 & 0 & 0 & 0 & 0 & a \end{bmatrix}.$$

The purpose of W 252 is to provide a way for the user to provide guidance as to whether it is more important to match the commanded linear velocity or the commanded angular velocity. The user is essentially stating that given a linear velocity error $v_{error}$ and an angular velocity error $\omega_{error}$, these two errors are of "equal" significance if:

$$v_{error} = a\omega_{error}.$$

Note that due to the differing units for $v_{error}$ and $\omega_{error}$, the angular weighting factor can include units (e.g.

$$\left(e.g.\ a = 1\frac{m}{rad}\right).$$

it is worth noting that there are many alternative ways to formulate W 252 than that shown above. Because W 252 is a configurable input into the logic system 1000, its actual construction can be determined depending on the characteristics desired of the specific embodiment being implemented, such as by the manufacturer or user of the device 100. If, for example, the velocity error in some directions was more important than in other directions, the matrix W 252 could be modified in order to represent this (e.g. by replacing some of the 1 values in the above example with larger or smaller values).

The improved joint limiting logic 250 then constructs the revised joint movement command for the robotic device according to the following equations:

$$\dot{q}_{mod} = J_{mod}(J_{mod}^T W^2 J_{mod})^{-1} J_{mod}^T W^2 \dot{x}_{cmd}$$

$$\dot{q}_{new} = re(\dot{q}_{mod})$$

wherein $\dot{q}_{mod}$ 253 is the (n−L)×1 joint velocity command for the joints that are not currently being limited, $\dot{q}_{new}$ 254 is the n×1 new joint velocity command, $J_{mod}$ 251 is an m×(n−L) matrix, $J_{mod}^T$ is the transpose of $J_{mod}$ 251, W 252 is an m×m matrix generated using the weighting factor 204, and $\dot{x}_{cmd}$ 203 is the desired movement command for the end-effector 116.

The new joint velocity command, $\dot{q}_{new}$ 254, is reconstructed from $\dot{q}_{mod}$ 253 via the reconstruction function re( ). This function simply substitutes in zero terms for each of the joints that is actively being limited. As an example, consider a manipulator with six joints, where joints 2 and 4 are at joint limits and must be prevented from exceeding their limits. Then:

ActiveLimits=[0 1 0 1 0 0]

Assume that the above equations produced a result for $\dot{q}_{mod}$ 253 of:

$$\dot{q}_{mod} = \begin{bmatrix} 1.5 \\ -2 \\ 0.5 \\ 3.5 \end{bmatrix} \frac{rad}{s}$$

Then $\dot{q}_{new}$ 254 would be:

$$\dot{q}_{new} = \begin{bmatrix} 1.5 \\ 0 \\ -2 \\ 0 \\ 0.5 \\ 3.5 \end{bmatrix} \frac{rad}{s}$$

Then, utilizing the new joint velocity command 254 in place of the original command results in a new end-effector velocity of $\dot{x}_{new}$ that is the end-effector 116 velocity that is as near as possible to the original commanded tool velocity $\dot{x}_{cmd}$ 203 without violating any of the joint 112 angular limits.

Theoretically, $\dot{q}_{new}$ 254 should indicate movement for each of the joints 112 that does not exceed the angular limits of any of the joints 112. As a practical matter, however, because of rounding errors and the like it may be desirable to verify that $\dot{q}_{new}$ 254 does, in fact, remain within the angular limits for all joints 112, and this is the function of double-check logic sub-system 270. Any suitable method may be employed to verify $\dot{q}_{new}$ 254, as known in the art. The output 271 of the logic subsystem 270, which is typically just $\dot{q}_{new}$ 254, can then be used as input into the actuator driver circuitry 150 to control the joints 112 accordingly. Of course, as previously indicated with reference to FIG. 3, further parsing of the output command 271 (i.e., $\dot{q}_{new}$ 254) may be desirable, such as checking for singularities 300 and ensuring that velocities and accelerations are within joint capabilities 400.

The benefit of intelligent joint limits handling as provided by logic system 200 is that "all or nothing" behavior for the end-effector 116 is avoided. As one or more joint 112 limits are reached and then exceeded by the end-effector 116 desired movement command $\dot{x}_{cmd}$ 203 provided by the user, the end-effector 116 does not simply stop. Rather, the end-effector 116 continues to try to move in a direction that most closely resembles the desired command $\dot{x}_{cmd}$ 203. Hence, the end-effector 116 continues to provide movement generally towards the user's desired goal. That is, revised joint movement command $\dot{q}_{new}$ 254 when subsequently executed by the robotic system 100 causes further, subsequent movement of the robotic arm 110 that is as close as possible to the desired movement command $\dot{x}_{cmd}$ 203 but which also causes actual movement of at least one of the actuators 114 in the arm 110, rather than simply a freezing or stalling of the arm 110 entirely. The "closeness" of movement can be set by the user, manufacturer or both by way of the weighting matrix W 252, and hence the logic system 200 is highly configurable and can be tailored to the needs of the device, the job at hand, the user and combinations thereof.

All of the apparatus, methods and algorithms disclosed and claimed herein can be made and executed without undue experimentation in light of the present disclosure. While the invention has been described in terms of preferred embodiments, it will be apparent to those of skill in the art that variations can be applied to the apparatus, methods and sequence of steps of the method without departing from the concept, spirit and scope of the invention. More specifically, it will be apparent that certain components can be added to, combined with, or substituted for the components described herein while the same or similar results would be achieved. All such similar substitutes and modifications apparent to those skilled in the art are deemed to be within the spirit, scope and concept of the invention as defined.

We claim:

1. A system for controlling a robotic device, the robotic device comprising joints moving an end-effector that operates in an m degrees of freedom task space, the robotic device being driven by n actuators, the system in communications with actuator driver circuitry to control the actuators, the system comprising:
   a processing unit in communications with the actuator driver circuitry; and
   a memory in communications with the processing unit, the memory comprising program code executable by the processing unit to cause the processing unit to perform the following steps:
      determining if a desired movement command for the robotic device would cause at least a first joint of the n actuated joints to violate a corresponding joint travel limit;
      constructing a modified Jacobian matrix $J_{mod}$ by removing a matrix column directly from a Jacobian matrix J that is associated with the first joint which would violate the corresponding joint travel limit if the desired movement command is executed, where the Jacobian matrix J is an m×n matrix mathematically expressing current positions of the joints;
      constructing a revised movement command for the robotic device by solving the following equation:

$$\dot{q}_{mod} = J_{mod}(J_{mod}^T W^2 J_{mod})^{-1} J_{mod}^T W^2 \dot{x}_{cmd}$$

wherein $\dot{q}_{mod}$ is an (n−L)×1 joint velocity command for joints that are not currently being limited, $J_{mod}$ is an m×(n−L) matrix, $J_{mod}^T$ is the transpose of $J_{mod}$, W is an m×m matrix comprising weighting factors to weight respective movements of the n actuated joints, and $\dot{x}_{cmd}$ is the desired movement command for the end-effector of the robotic device, where the revised movement command prevents the first joint from violating the corresponding joint travel limit, is not identical to the desired movement command and if submitted to the actuator driver circuitry causes movement of at least a portion of the n actuated joints; and
      utilizing the revised movement command in place of the desired movement command to control the actuator driver circuitry to cause corresponding movement of the robotic device.

2. The system of claim 1, wherein the revised movement command is constructed by solving the following equation:

$$\dot{q}_{new} = re(\dot{q}_{mod}),$$

wherein $\dot{q}_{new}$ is an n×1 new joint velocity command, and re( ) is a function that inserts a respective predefined value for each of the L actively limited joint into $\dot{q}_{mod}$ to generate $\dot{q}_{new}$.

3. The system of claim 2, wherein the program code further causes the processing unit to determine if $\dot{q}_{new}$ would cause any of a plurality of joint travel limits of the robotic device to be violated.

4. The system of claim 1, wherein the program code further causes the processing unit to generate the m×(n−L) matrix $J_{mod}$ by:
   determining an m×n Jacobian matrix J for the robotic device utilizing the current state of the robotic device, the current state of the robotic device comprising current displacements of each of the n joints; and
   utilizing the Jacobian matrix J to generate the matrix $J_{mod}$, wherein $J_{mod}$ comprises all columns in J except for those columns corresponding to the L actively limited joints.

* * * * *